United States Patent [19]

Hamaguchi et al.

[11] Patent Number: 4,545,661
[45] Date of Patent: Oct. 8, 1985

[54] FOLDING CAMERA WITH MOVABLE MEMBER MOUNTING AN OBJECTIVE LENS AND REFLEX MIRROR

[75] Inventors: Takehiko Hamaguchi; Kiyoaki Hazama; Kenichi Iwaida, all of Hachioji; Takeyoshi Iguchi, Tokyo, all of Japan

[73] Assignee: Konishiroku Photo Industry Co., Ltd., Tokyo, Japan

[21] Appl. No.: 492,493

[22] Filed: May 5, 1983

[30] Foreign Application Priority Data

May 19, 1982 [JP] Japan .................. 57-85586

[51] Int. Cl.⁴ ............... G03B 17/04; G03B 17/52; G03B 19/12
[52] U.S. Cl. ............... 354/86; 354/149.11; 354/158; 354/187
[58] Field of Search ........... 354/86, 187, 189, 192, 354/194, 158 X, 149.11

[56] References Cited

U.S. PATENT DOCUMENTS

| 3,589,253 | 6/1971 | Erlichman | 354/187 |
| 3,683,770 | 8/1972 | Land et al. | 354/86 |
| 3,709,122 | 1/1973 | Blinow et al. | 354/83 |
| 3,709,131 | 1/1973 | Plummer | 354/158 |
| 4,121,233 | 10/1978 | Hudspeth | 354/83 |
| 4,392,732 | 7/1983 | Pizzuti | 354/187 |

FOREIGN PATENT DOCUMENTS 50-34530  4/1975  Japan .
51-112330 10/1976  Japan .

Primary Examiner—A. A. Mathews
Attorney, Agent, or Firm—Jordan B. Bierman

[57] ABSTRACT

A foldable camera for self-developing film comprises a base housing and a movable member pivotable between a closed position integrated with the housing and an open, elevated position above the housing. The movable member is mounted to a supporting member which is pivotally coupled to the housing at the end opposite from the film exit end of the housing. An objective lens and a reflex mirror are fixedly mounted to the movable member in fixed relationship to each other such that they are in the proper positions for film exposure when the movable member is pivotted to the elevated position.

8 Claims, 19 Drawing Figures

FOLDING CAMERA WITH MOVABLE MEMBER MOUNTING AN OBJECTIVE LENS AND REFLEX MIRROR

BACKGROUND OF THE INVENTION

1. Field of the invention

The present invention relates to an improvement of a self-developing camera, also called an instant camera.

2. Description of the prior art

In self-developing cameras for amateur use which use self-developing film, the camera body itself tends to be larger because their image frame size is larger than that of general miniature cameras. However, it would be advantageous that the camera body be smaller and of lighter weight and handles more easily. There have been many proposals relating to such self-developing cameras. For example, U.S. Pat. No. 3,709,122 discloses a self-developing camera that is a finder-collapsible compact single lens reflex camera. This camera has the disadvantage that because of the single lens reflex type, it needs to oscillate the reflex mirror each time when an exposure is made, so that the time lag between the time the shutter button is depressed and the time when an actual exposure is made is so long that an object can move during the time interval or an exposure is made with the mirror insufficiently settled, thus causing the resulting image to be degraded. In addition, because the collapsing of the finder is made by pivoting on 4 pivots, the mechanism is complicated. And if the angle formed by and between the sheet film plane and the reflex mirror plane is made less than 45° and the space between the film plane and the mirror is small, the reflection is repeated many times between the film plane and the reflex mirror, tending to produce a ghost image. Further, if the self-developing camera has an exposure lens-foldaway structure wherein the lens is folded so as not to be superposed upon a film cassette when the camera is in the folded position because the image frame size thereof is relatively large, the camera body can be made flat, but instead its flat area becomes so large that its portability tends to be reduced.

Japanese Patent Publication Open to Public Inspection (hereinafter referred to as Japanese Patent O.P.I. Publication) No. 34530/1975 proposes a self-developing camera wherein an exposure lens member is pivotally coupled to an end of a film cassette holder, and also a reflex mirror is pivotally coupled to the other end of the holder, the two movable members being such as to be folded inwardly toward each other. In this camera, however, the exposure lens, as a barrier type, is difficult to fit inside the camera frame. In order to make the camera more compact, the exposure lens and reflex mirror are required to be located as close to each other as possible. If located too close to each other, the two become difficult to be folded inwardly toward each other, while if a sufficient space is provided between the two, the size of the camera in the picture-taking position becomes larger. In addition, the optical axis of the exposure lens, if brought closer to the film cassette holding position, produces a flare between the reflex mirror and the film plane, so that it may not be brought excessively close to the position. Accordingly, the proposed camera has the disadvantage that if the exposure lens and reflex mirror are to be folded inwardly toward each other with both ends of the holder as pivotal axes, the interval between both ends of the holder must be made larger, and the camera can be folded flat but tends to become so large that the portability thereof is reduced.

SUMMARY OF THE INVENTION

The present invention has been made from the standpoint of human engineering of the optimum photographing angle of view and the like, and an object of the present invention is to remove the disadvantage of the above-described conventional products. The object is accomplished by the following self-developing camera: In a foldable self-developing camera wherein a film cassette is arranged in the exposure position, and a sheet film loaded inside the film cassette is exposed to the light coming through an exposure lens and a reflex mirror from an object, and then developed by developing rollers or the like, the camera comprises at least a fixed member having a film cassette-holding member, an exposure lens which is movable when folding the camera, a reflex mirror which is also movable when folding the camera's movable member that moves in relation to both the exposure lens and the reflex mirror, a pivotally supporting member which is pivotally coupled to the fixed member and provided at an edge of the reflex mirror, the edge being on the side closer to the film in the exposure position and in the proximity of the side of the film cassette opposite to the film exit side thereof, and a finder member whose optical axis, when the camera is in the picture-taking position, is in parallel or nearly in parallel with the film developing direction and which is located close to the exposure lens. When the camera is in the folded position, the exposure lens, interlockingly with the movement of the camera's movable member, is folded superposedly upon the point near the edge on the film cassette exit side of the image frame or upon a developing member such as the developing rollers. Namely, according to the present invention, the change in the camera position from the folded position to the picture-taking position is effected by a relatively simple operation, in which the opening degree of the camera's movable member can be small. And when in the folded position, the camera is well balanced in longitudinal, transverse and thickness dimensions for portability. Further, by providing the finder on the side of the exposure lens in the folded position, the camera can be of the well-operative box type and also can be of the barrier type structure in which the exposure lens may be readily covered by the movable member when in the folded position.

As is disclosed in Japanese Patent O.P.I. Publication No. 112330/1976, in order to prevent the flare in the image reversing type, the reflex mirror is not allowed to be brought excessively close to the film-holding section side. Therefore if the pivoting of the movable member is made at a point near the intersecting point of the fixed member's upper plane and the reflex mirror plane, the movable part can be made small in size because the optical path of the exposure optical system is considerably narrow, and about half of the optical path of the rectangular pyramidal body formed with the exposure lens as the vertex becomes folded into the lower half, so that the spacing between the fixed part and the movable part in the folded position can be small, thus enabling easily the miniaturization of the camera. Further the spacing in the portions held on both sides of the fixed member of the box type is easily securable, so that the camera may be as stably held by hand as if when a binocular is held. Consequently there could occur no unintentional touch by fingers to the film ejected from the camera held by hand nor unintentionally covering with the hand the exposure lens of the light-receiving window at the time of shutter releasing, which can occur in conventional cameras.

The present invention which has been described above has the following advantages:

(1) The camera, when folded, has a rectangular form well-balanced in longitudinal, transverse and height dimensions and excellent in portability.
(2) The camera has no finder projection even when in the picture-taking position, so that the camera can be as stably held as a binocular is held. The shutter release button may be provided in any natural position that is readily depressible, so that there occurs little camera-shake and no unintentional touching with the fingers of the film being ejected out of the film exit.
(3) The finder is clearly viewable without use of any complex optical system and, because there is no projection underneath the finder eye piece portion, the finder is easily viewable.
(4) If a simple cover is provided inside, the camera may be carried with no camera case; i.e., may be of the barrier type, so that snap shooting can be readily conducted.
(5) The structure is simple: the operation of the camera from the folded position to the picture-taking position and vice versa is simple.

Other objects of the invention will be obvious evident as described hereinafter.

The invention accordingly comprises an apparatus possessing the construction, combination of elements and arrangement of parts which are exemplified in the following detailed disclosure, and the scope of which will be indicated in the claims.

BRIEF DESCRIPTION OF THE DRAWINGS

For a fuller understanding of the nature and objects of the invention, reference should be made to the following detailed description taken in connection with the accompanying drawings wherein:

FIG. 1 shows the camera in the folded posi while FIG. 2 shows the camera in the ready for-picture-taking position.

DETAILED DESCRIPTION OF THE INVENTION

Description of the preferred embodiment

Figure 1:
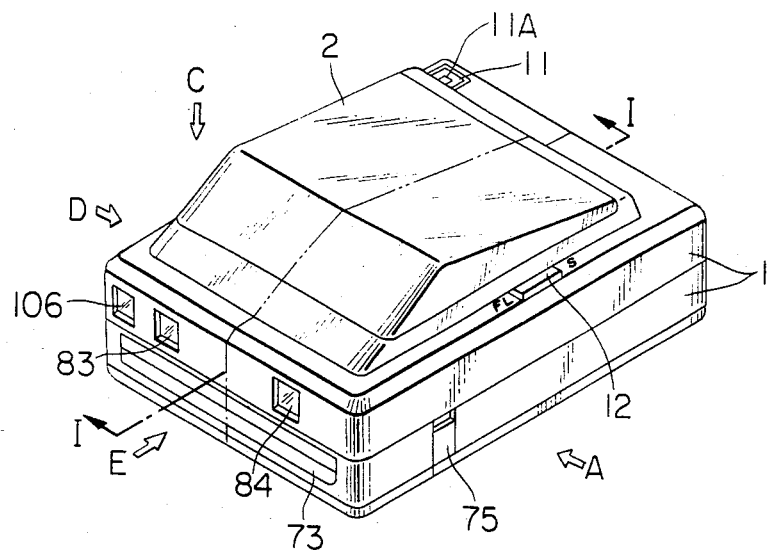
FIG. 1 and FIG. 2 are perspective views showing an example of the camera of this invention.
Figure 2:
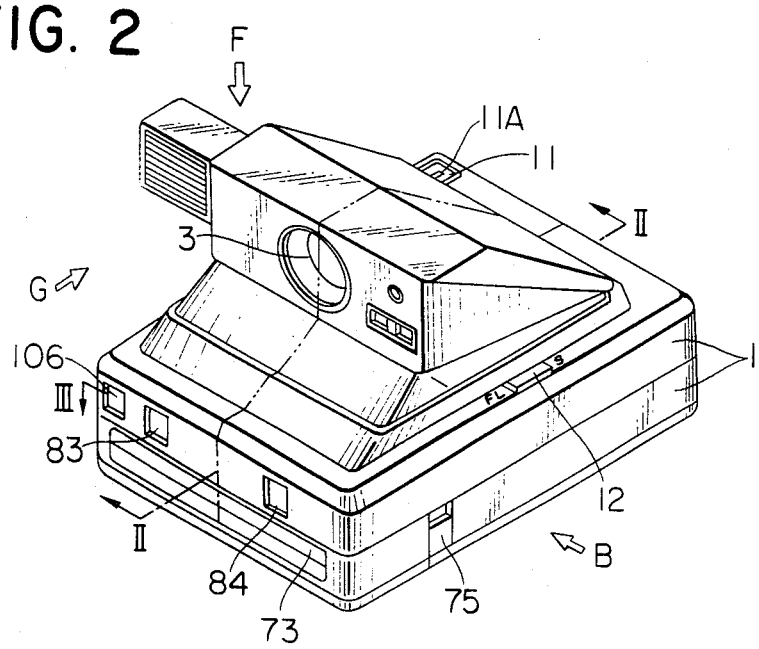

Examples of the self-developing camera of the present invention will be illustrated in detail in the drawings wherein FIG. 1 and FIG. 2 are overall perspective views. FIG. 1 shows the folded nonpicture-taking position of the camera, and FIG. 2 shows the ready-for-picture-taking position of the camera wherein movable member 2 is moved to the up position from fixed member 1. In these drawings, a shutter button 11 is in the corner of a side of fixed member 1, and an electronic flash firing button 11A is located adjacent to shutter button 11. Shutter button 11 is so located that the shutter can be released with the camera held by hand. As electronic flash-firing button 11A is adjacent to shutter button 11, in normal photographing, shutter button 11 and electronic flash firing button 11A can simultaneously depressed to enable quick shooting.

Numbered 12 is a self-focusing lock button which is moved backward to set a self-timer and moved forward to lock the autofocusing value. Self-autofocusing lock button 12 can also be operated with the camera held by hand.

Figure 3A:
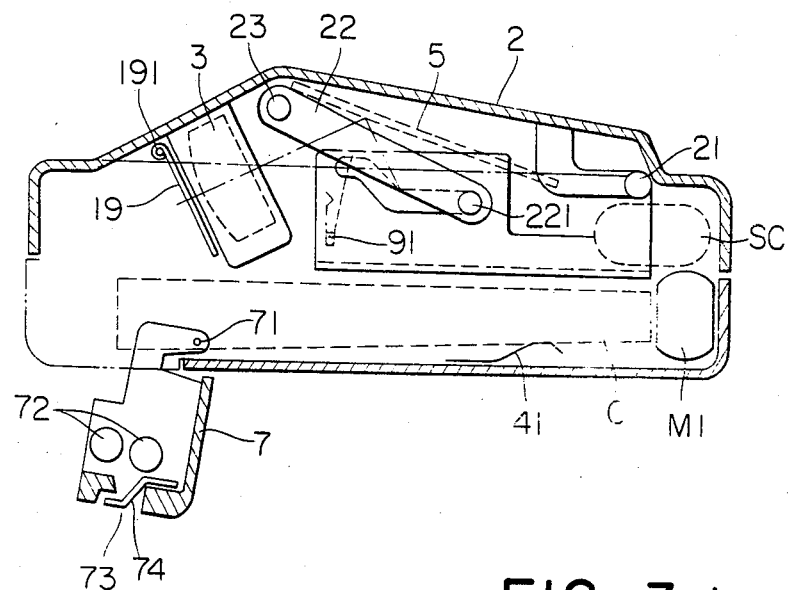
FIG. 3(a) and FIG. 3(b) are sectional views of the movable member opening-closing mechanism and film cassette entrance and holding sections viewed from Arrow A of FIG. 1 and Arrow B of FIG. 2, respectively.
Figure 3B:
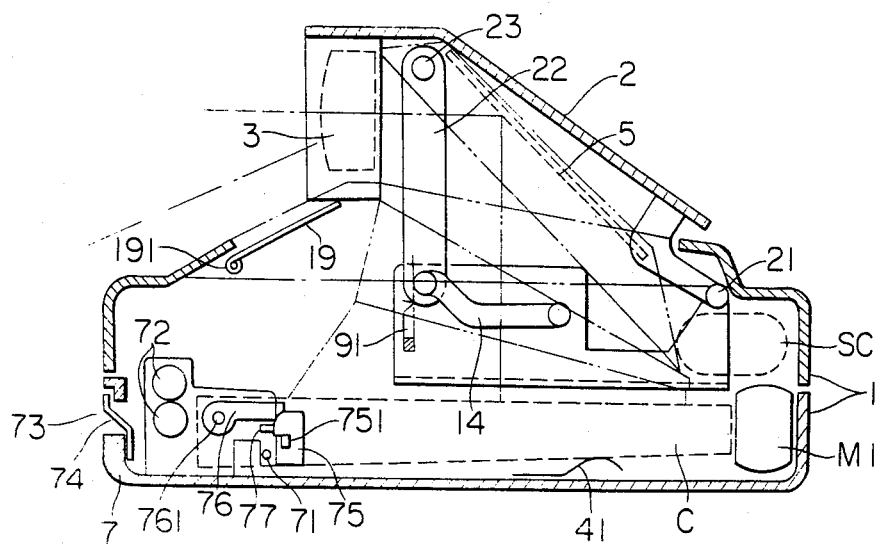

FIG. 3(a) is a sectional view showing the movable member opening-closing mechanism and film cassette entrance and holding section viewed from Arrow A of FIG. 1. FIG. 3(b) is a sectional view showing the movable member opening-closing mechanism and film cassette entrance and holding section viewed from Arrow B of FIG. 2. Movable member 2 which is the picture-taking body having exposure lens 3 and reflex mirror 5 is supported by a pivotally supporting member 21 which is pivotally coupled to fixed member 1 which is the body holding film cassette C. Exposure lens 3 and reflex mirror 5 are fixed to movable member 2 so as to be integral parts thereof. Fixed member 1 comprises a holding means to hold film cassette C, a developing roller unit 72 and sheet film exit 73 from which a developed sheet is ejected. Pivot member 21 is located in the proximity of the intersecting point of the external upper surface plane of fixed member 1 and reflex mirror 5 plane in the picture-taking position.

The opening-closing mechanism of movable member 2 is illustrated below:

Movable member 2 has on both transverse sides thereof a pair of lock arms 22. An end of each of lock arms 22 is mounted to pivot 23 provided on movable member 2, and roller 221 provided at the other end of lock arm 22 is slidably fit in along cam slot 14 provided to for moving along the slot according to the opening and closing of movable member 2. Lock arm 22 is resiliently biased in the clockwise direction by a spring (not shown) provided on pivot 23. Movable member 2, when raised in the clockwise direction, turns pivotally on supporting member 21 to move into the ready-for-picture-taking position. And when movable member 2 is moved to the down position by pushing lock arms 22 in the counterclockwise direction, the camera assumes the folded position. The opening and closing of movable member 2 are very simply carried out as has been described above. The front of fixed member 1 is provided with a light-shield member 19 which is spring-biased in the counterclockwise direction to pivot on pivot member 191 to cover the inside while the camera is in the picture-taking position. In addition, fixed member 1 is provided with an electronic flash switch 91 which is turned ON when the switch is depressed by lock arms 22 at the time of raising movable member 2, thus starting the charging of the capacitor for the electronic flash.

Next, the opening-closing mechanism of roller cover 7 is illustrated below:

Roller cover 7 is a cover that opens and closes pivoting on the opening-closing pivot 71 and has thereinside a pair of film-advancing rollers 72. A film sheet ejected by film-advancing rollers 72 is ejected out of film exit 73. Film exit 73 is provided with a movable cover 74 which serves to intercept light except when a processed film sheet is ejected from the exit.

Figure 4A:
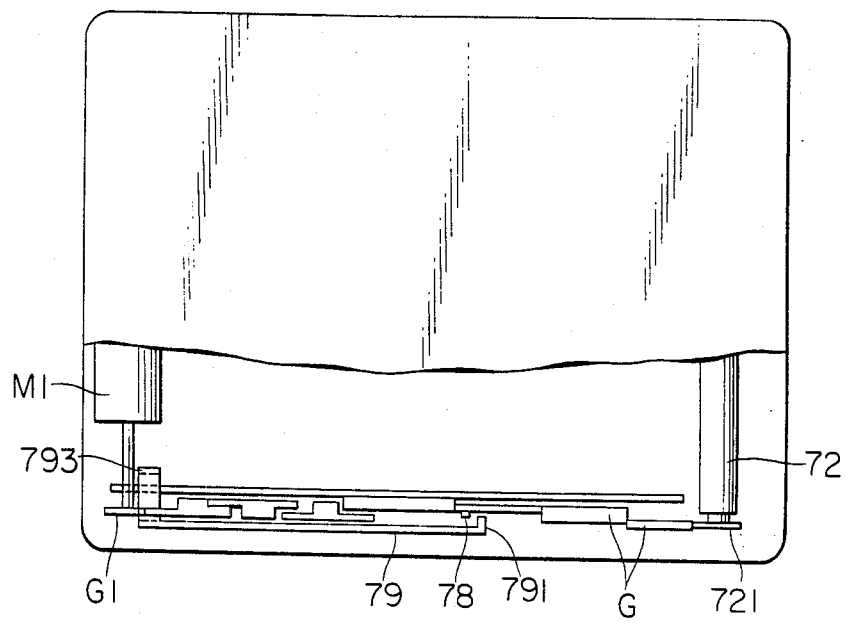
FIG. 4(a) is a plan view and FIG. 4(b) is a sectional view of the film-advancing mechanism viewed from Arrow C and Arrow D, respectively of FIG. 1.
Figure 4B:
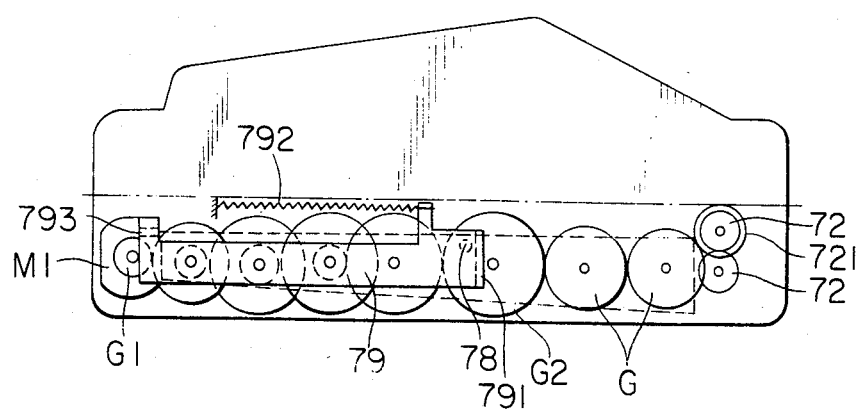

When roller cover opening-closing button 75 which is slidably movable up and down is pushed upward, a projection 751 provided on the back of the opening-closing button 75 pushes a claw 76 up. When claw 76 is then pushed up in the counterclockwise direction pivoting on pivot member 761, a projection 77 which is engaged with claw 76 becomes disengaged. Projection 77 is a projection that is provided to roller cover 7, so that roller cover 7 opens pivoting on opening-closing pivot 71. Film cassette C is loaded by opening roller cover 7 and pushing the film cassette rightward. Fixed member 1 is provided thereinside with a stopper (not shown), and when film cassette C is pushed as far as it goes, an electric connection with film cassette C is made by electric contact 41. When roller cover 7 is closed, gear 721 provided on one of film-advancing rollers 72 is engaged with gear G provided inside fixed member 1 (FIG. 4(b)). FIG. 4 shows the principal part of the film-advahcing section. FIG. 4(a) is a sectional view viewed from Arrow C and FIG. 4(b) is a sectional view viewed from Arrow D of FIG. 1. The revolution of roller drive motor M1 is transmitted from a gear G1 mounted thereto through the gears of gear train G that engage with gear G1 to gear G2 so that gear G2 makes one revolution. Gear G2 is provided on one side thereof with a projection 78. A movable plate 79 that engages at bent portion 791 thereof with projection 78 is resiliently biased leftward by a spring 792, and movable plate 79 makes one lateral reciprocating motion by the revolution of gear G2, and then a raised portion 793 provided for pushing film on movable plate 79 pushes a corner of film cassette C to push rightward one film sheet inside cassette C. The film sheet pushed rightward is then ejected out through film exit 73 by film-advancing rollers 72.

Figure 5A:
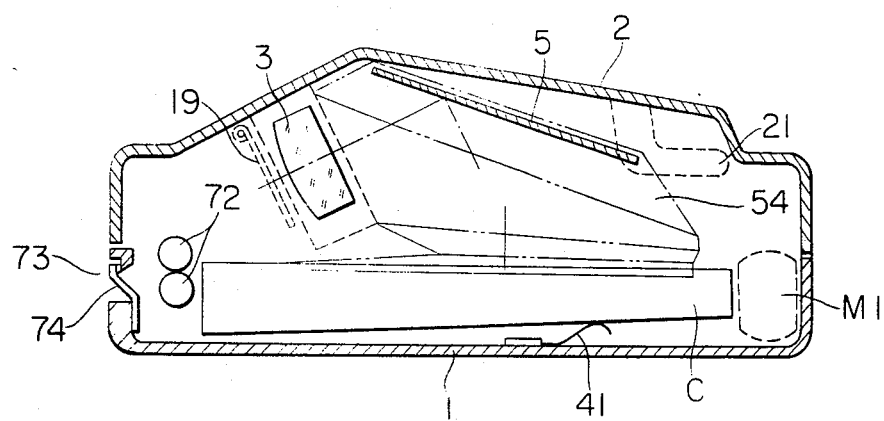
FIG. 5(a) is a sectional view across the line I—I of FIG. 1.
Figure 5B:
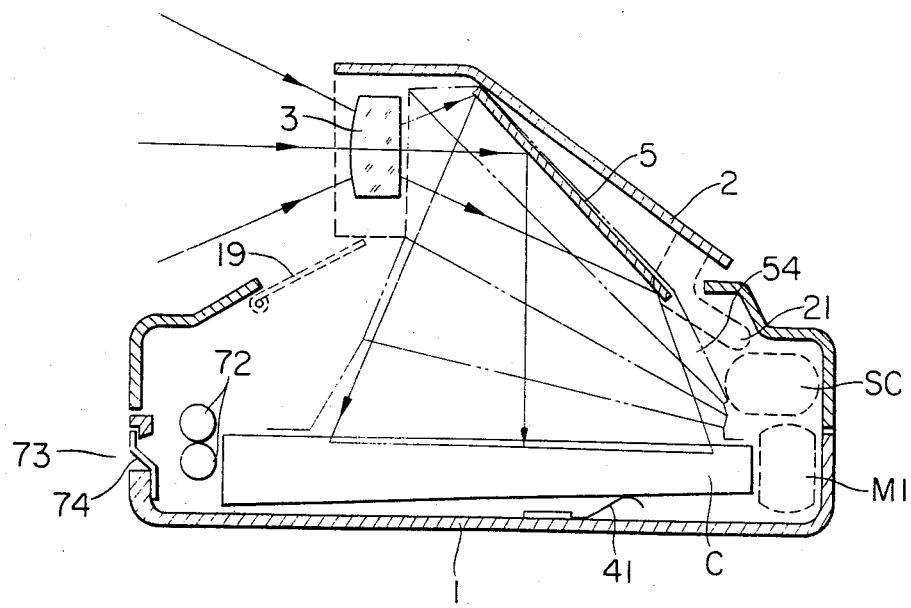
FIG. 5(b) is a sectional view across the line II—II of FIG. 2.

FIG. 5(a) is a longitudinal sectional view as seen in the direction of arrows from the line I—I of FIG. 1, and FIG. 5(b) is a longitudinal sectional view as seen in the direction of arrows from the line II—II of FIG. 2. With reference to these figures the operation of the movable mirror and the optical path will be illustrated below:

Exposure lens 3 and reflex mirror 5 are fixed to movable member 2. When the camera is in the folded position, exposure lens 3 is covered with both fixed member 1 and movable member 2. As movable member 2 is moved to the up position from the folded position of the camera as shown in FIG. 5(a), reflex mirror 5 is gradually raised along with the movement of movable member 2. In the picture-taking position, the light coming through the optical axis of exposure lens 3 is bent at an angle of 90 degrees by reflex mirror 5 to strike perpendicularly upon a film sheet. The side of reflex mirror 5 facing the sheet film is spaced from the sheet film so that no ghost appears on the photographed image. The optical path of the exposure optical system is considerably narrow at the reflective plane of reflex mirror 5, so that the sizes of the reflex mirror and of movable member 2 may be made small.

In order to cover the above-mentioned optical path through exposure lens 3, there is provided a bellows 54, a light-shield member in the sleeve form made of cloth, paper, etc., having exposure lens 3 as its one opening and film cassette C mounting frame (aperture) as the other opening. Bellows 54 is in the form of having thereinside reflex mirror 5 and serves to cover the optical path when photographing and is folded to become flat when the camera is in the folded position.

Figure 6:
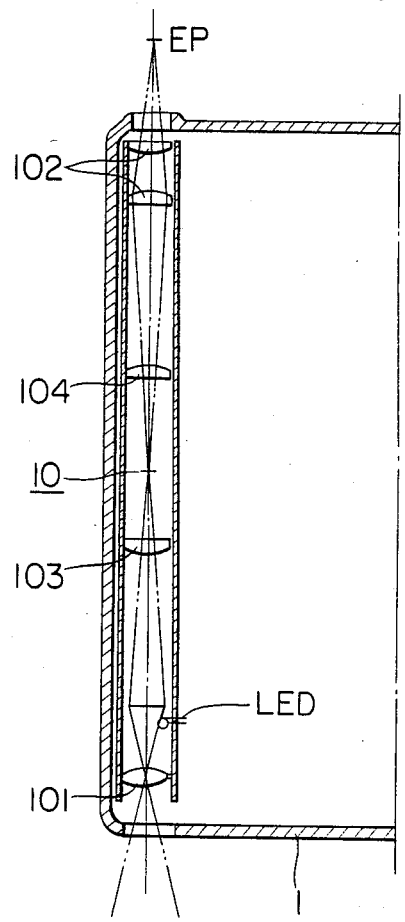
FIG. 6(a) is a sectional view of the finder unit across the line III—III of FIG. 2.
FIG. 6(b) is a front view of the finder arrangement.
Figure 6:
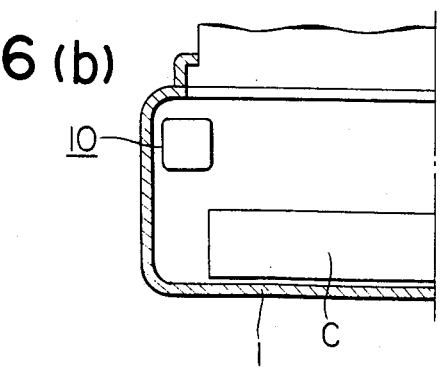

FIG. 6 shows the finder system. FIG. 6(a) is a longitudinal sectional view as seen in the direction of arrows from the line II—II of FIG. 2. FIG. 6(b) is a front view of the finder system. Finder 10 is a direct view finder provided in fixed member 1 and comprises a finder lens 101 and eye piece 102 and relay lenses 103 and 104 therebetween to define the photographable range (angle of view). A semi-transparent mirror (not shown) is provided in between the lenses of eye piece 102 to define as an Albada finder the autofocusing range. Further, in the visual field, a light source such as a light emission diode (LED) or the like is provided to tell completion of charging the capacitor for the electronic flash. In addition, the SC shown in FIG. 3 is the capacitor for the electronic flash.

Figure 7:
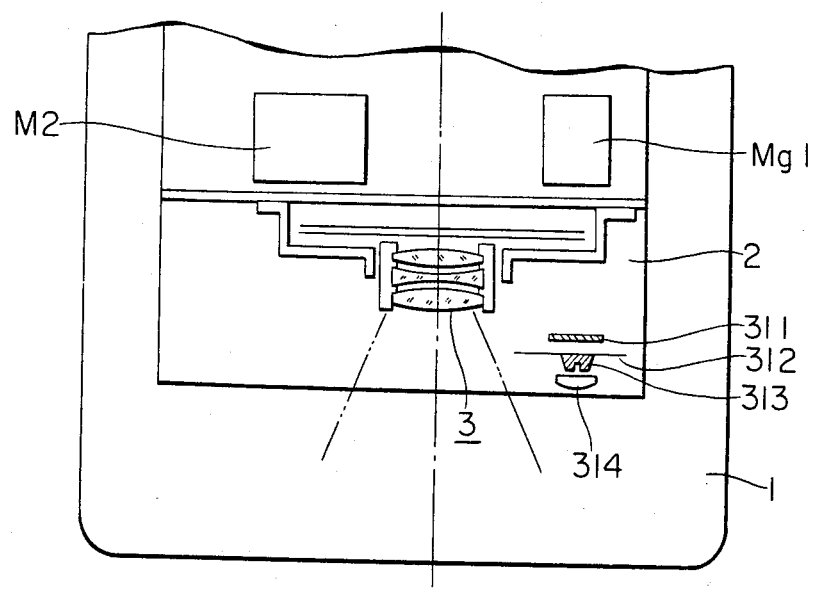
FIG. 7(a) is a plan view viewed from Arrow C of FIG. 1.
FIG. 7(b) is a front view viewed from Arrow E of FIG. 1.
Figure 7:
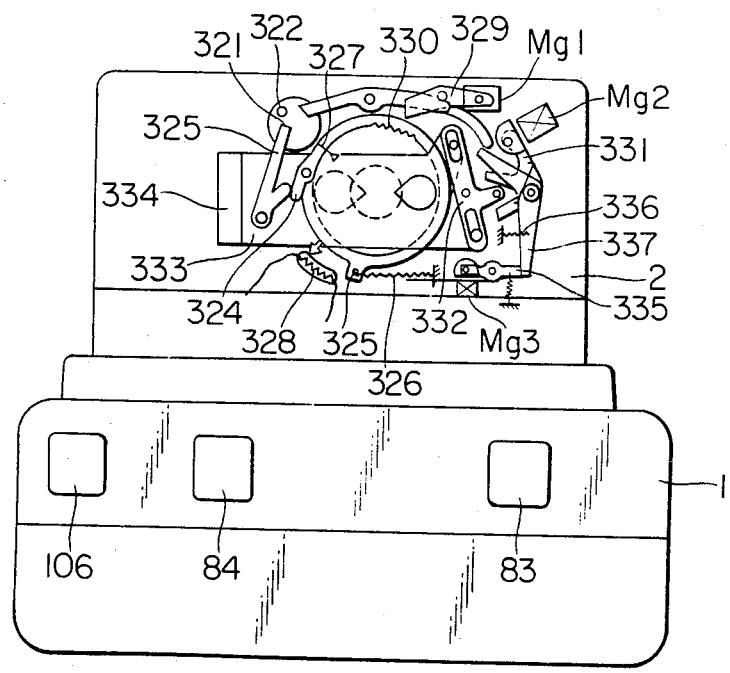

FIG. 7 shows the mechanism related to the exposure lens shutter and AE, wherein FIG. 7(a) is a plan view of the principal part viewed from Arrow C of FIG. 1, and FIG. 7(b) is a front view of the principal part viewed from Arrow E of FIG. 1.

Figure 8A:
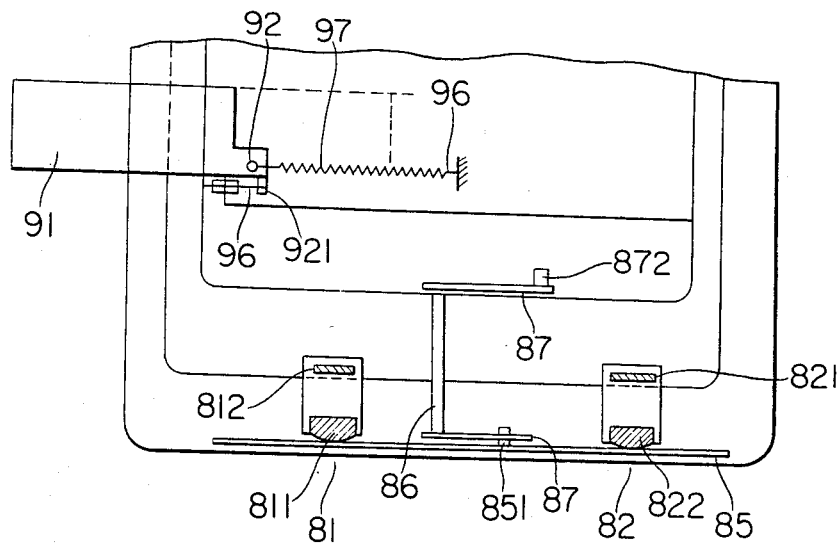
FIG. 8(a) is a plan view of the electronic flash unit viewed from Arrow F of FIG. 2.
Figure 8B:
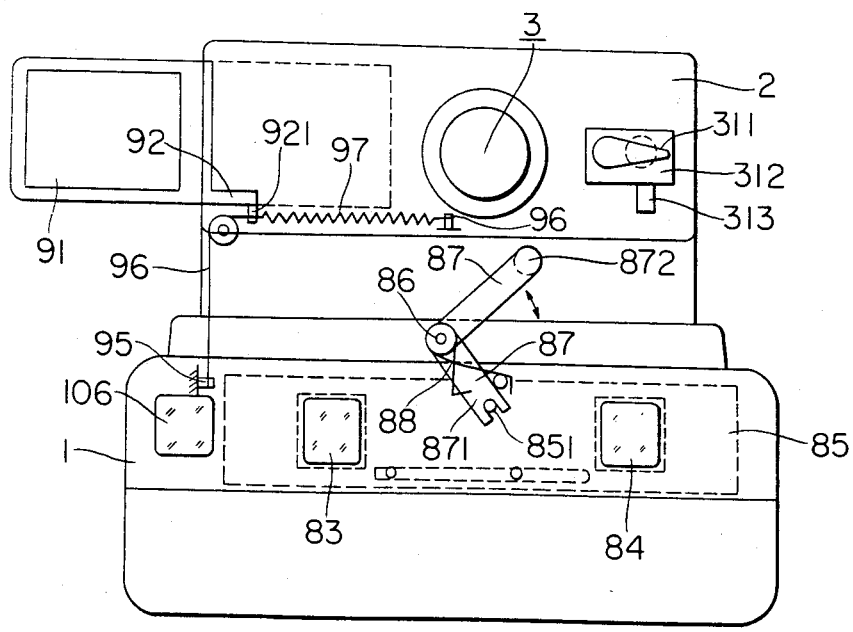
FIG. 8(b) is a front view of the electronic flash unit viewed from Arrow G.

FIG. 8 shows interlocking relations between the AE, autofocusing unit and electronic flash unit 9 and the raising operation of movable member 2, wherein FIG. 8(a) is a plan view of the principal part of the electronic flash unit viewed from Arrow F of FIG. 2, and FIG. 8(b) is a front view of the same from Arrow G of FIG. 2.

In FIG. 7(a) and FIG. 8(b), 31 is a EE light-receiving unit for exposure provided in movable member 2. In front of light-receiving element 311 are condensor lens and comma-shaped light-receiving mask 312. Moving laterally the print density control knob 313 that is an integral part of the light-receiving unit enables to vary the light-receiving area of light-receiving element 311 to thereby control the print density of an image to be photographed.

Autofocusing system 8 shown in FIG. 8(a) is provided in fixed member 1. Particularly, to avoid parallax, an infrared light emitter 81 for distance measurement is provided close to finder 10, and the light axis of infrared light emitter 81 is nearly in parallel with the optical axis of finder 10. 82 is the light receiving unit for distance measurement and is such that a spot light projected upon an object by light emitting element 811 of infrared light emitter 81 and lens 812 is focussed on a distance-measuring semiconductor element 822 by light-receiving unit's lens 821, and distance measurement is made according to the spot position focussed on semiconductor 822. Autofocusing system 8 is provided above the developing unit and nearly in parallel with the optical axis of exposure lens 3 inside fixed member 1, so that the system is of such a structure that greater accuracy is easily obtainable.

Next, the shutter operation is illustrated in the order of photographing steps with reference to FIG. 7(b).

The camera of the present invention has a motor in addition to the aforementioned roller drive motor M1. When shutter button 11 is depressed, photographing motor M2 reverses to rotate gear 321 in the counterclockwise direction. A pin 322 provided on the peripheral surface of gear 321 oscillates intermediate lever 323 in the clockwise direction and further oscillates stop lever 324 in the counterclockwise direction. The oscillation of stop lever 324 disengages the stoppage of lens unit 325 by hook 327 provided thereon, the lens unit being resiliently biased in the counterclockwise direction by spring 326, to rotate lens unit 325 in the counterclockwise direction. Exposure lens 3 is mounted to lens unit 325. Because lens unit 325 is helicoidally rotatably mounted to movable member 2, with the rotation of lens unit 325, exposure lens 3 is turned out. The rotation of lens unit 325 causes autofocusing position detecting resistor 328 to move slidingly to operate lens stopping magnet Mg1 by providing a comparative input into the comparator the detected voltage with the voltage obtained from autofocusing light-receiving element 822, and oscillates lock claw 325 in the counterclockwise direction to cause the lock claw to plunge into the ratchet claw provided on lens unit 325 to stop the rotation of lens unit 325, and then the movement of exposure lens 3 is stopped to effect autofocusing.

Shutter starting magnet Mg2 is then operated to turn fore-blade lever 321 in the counterclockwise direction. The turning of fore-blade lever 331 turns shutter link 332 in the clockwise direction which then moves laterally movable A-blade 333 and B-blade 334. Namely, A-blade 333 moves leftward and B-blade 34 moves rightward simultaneously, and when the openings of both blades coincide with each other, the shutter diaphragm opens.

When shutter magnet Mg3 operates for closing the shutter due to the information from EE light-receiving unit 31, after-blade stop lever 335 turns in the clockwise direction to disengage the engagement with after-blade drive member 337 that has been biased in the clockwise direction by spring 336. After-blade drive member 337 turns in the clockwise direction to turn the foregoing shutter link 332 in the counterclockwise direction to thereby move A-blade 333 rightward and B-blade leftward simultaneously, thus closing the shutter diaphragm.

The autofocusing is made as has been described above, which is then followed by shutter exposure. As to the shutter charge, the aforementioned photographing motor M2 revolves normally, gear 321 rotates in the clockwise direction, and related members including lens unit 325 are restored to the initial conditions.

Interlocking relations between electronic flash unit 9 and the raising operation of movable member 2 are subsequently illustrated. Both FIG. 8(a) and FIG. 8(b) show electronic flash unit 9 in the condition of sticking out (pop-up) away from the optical axis of exposure lens 3. Electronic flash unit 91 is mounted together with a laterally movable supporting member 92 to movable member 2. And a projection 921 provided on supporting member 92 is connected to a less-contractive wire 96 one end of which is connected to a projection 95 on fixed member 1, and further projection 921 is also connected to flexible spring 97 which is biased in the contractive direction. If movable member 2 is lifted, electronic flash unit 91 is pulled by wire 96 to stick out away from the optical axis of exposure lens 3.

If movable member 2 is pushed down after completion of photographing, the tension of spring 97 moves electronic flash unit 91 into movable member 2.

In this camera, with the folding of movable member 2, a finder window 106, autofocusing windows 83 and 84 which are provided on fixed member 1 are covered with a cover plate 85. In FIG. 8(a) and FIG. 8(b), fixed member 1 has a pivot 86 and a L-shaped-lever 87 which pivots upon the pivot 86. One end 871 of L-shaped lever 87 engages with a projection 851 provided on a laterally movable cover plate 85, and a projection 872 provided on the other end engages with movable member 2. L-shaped lever 87 is biased in the counterclockwise direction by spring 88, so that projection 872 provided on L-shaped lever 87 pushes the under surface of movable member 2. If movable member 2 is now raised, L-shaped lever 87 is turned in the counterclockwise direction by the force of biased spring 88 to move thin cover plate 85 so that the opening in the cover plate coincides with autofocusing windows 83 and 84, and the cover plate moves out of its position for covering finder windows 106, and thus finder window 106, autofocusing windows 83 and 84 are all in the open condition.

And when movable member 2 is pushed down to be in the folded position, L-shaped lever 87 is turned in the clockwise direction by movable member 2 to move cover plate 85 leftward, and then finder window 106, autofocusing windows 83 and 84 are all covered with cover plate 85 to be in the closed condition.

Figure 9A:
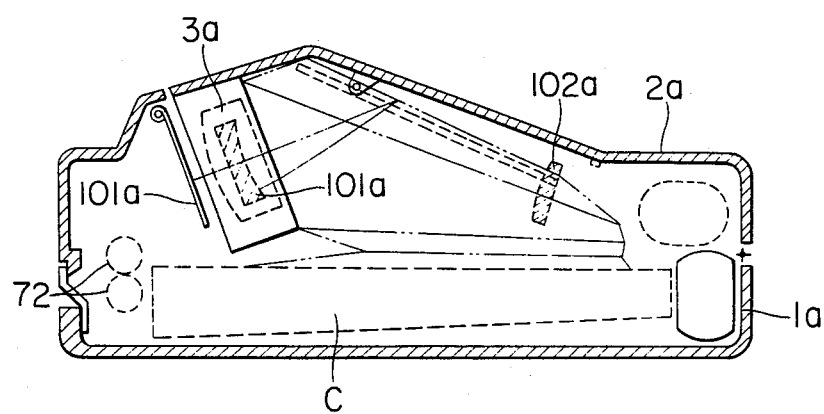
FIG. 9(a) and (b) sectional views of the camera in the second example of the invention.

The first example of the present invention is as has been described above. FIG. 9(a) and (b) and FIG. 10 (a) and (b) are sectional views of the second and third examples, respectively.

Figure 9B:
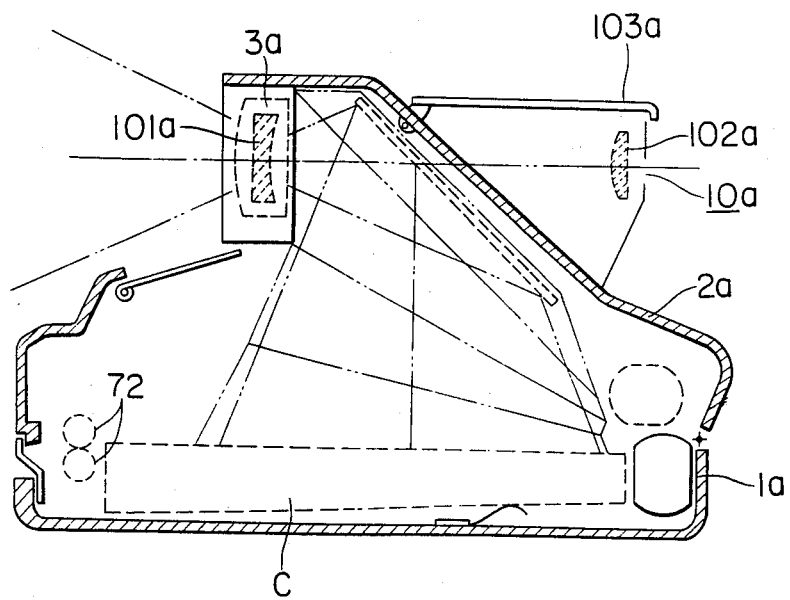

In the second example shown in FIG. 9, what is different from the first example is that finder unit 10a is provided in movable member 2a. An objective lens 101a composed of a concave lens is fixed in parallel with exposure lens 3a to movable member 2a, and an eye piece 102a is mounted to a finder supporting member 103a which is movable with respect to movable member 2a. Finder supporting member 103a is mechanically interlockingly movable with movable member 2a or may be moved manually. When in the picture-taking position in which movable member 2a is raised, finder 10a is in the state of being viewable therethrough, while in the condition that movable member 2a is folded, finder 10a is also in the state of being folded. In this example, the optical axis of the finder is arranged so close to the optical axis of the exposure lens that the parallax is very small.

Figure 10:
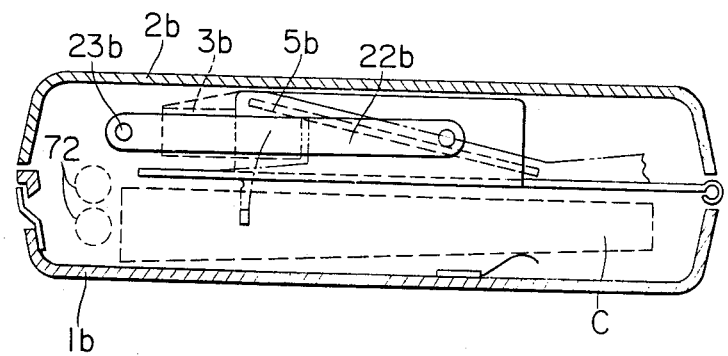
FIG. 10(a) and (b) are sectional views of the camera in the third example of the invention.
Figure 10:
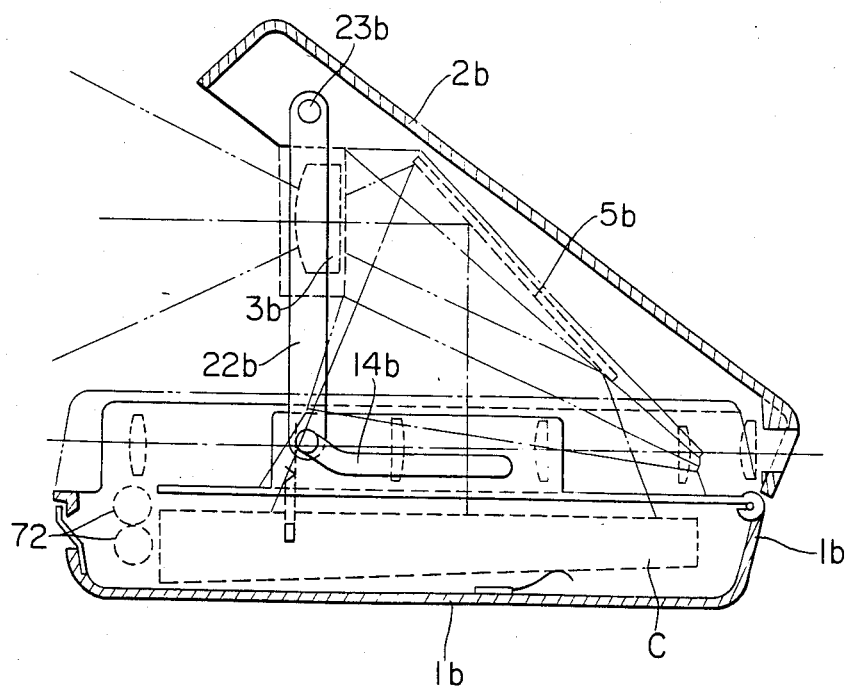
Figure 11:
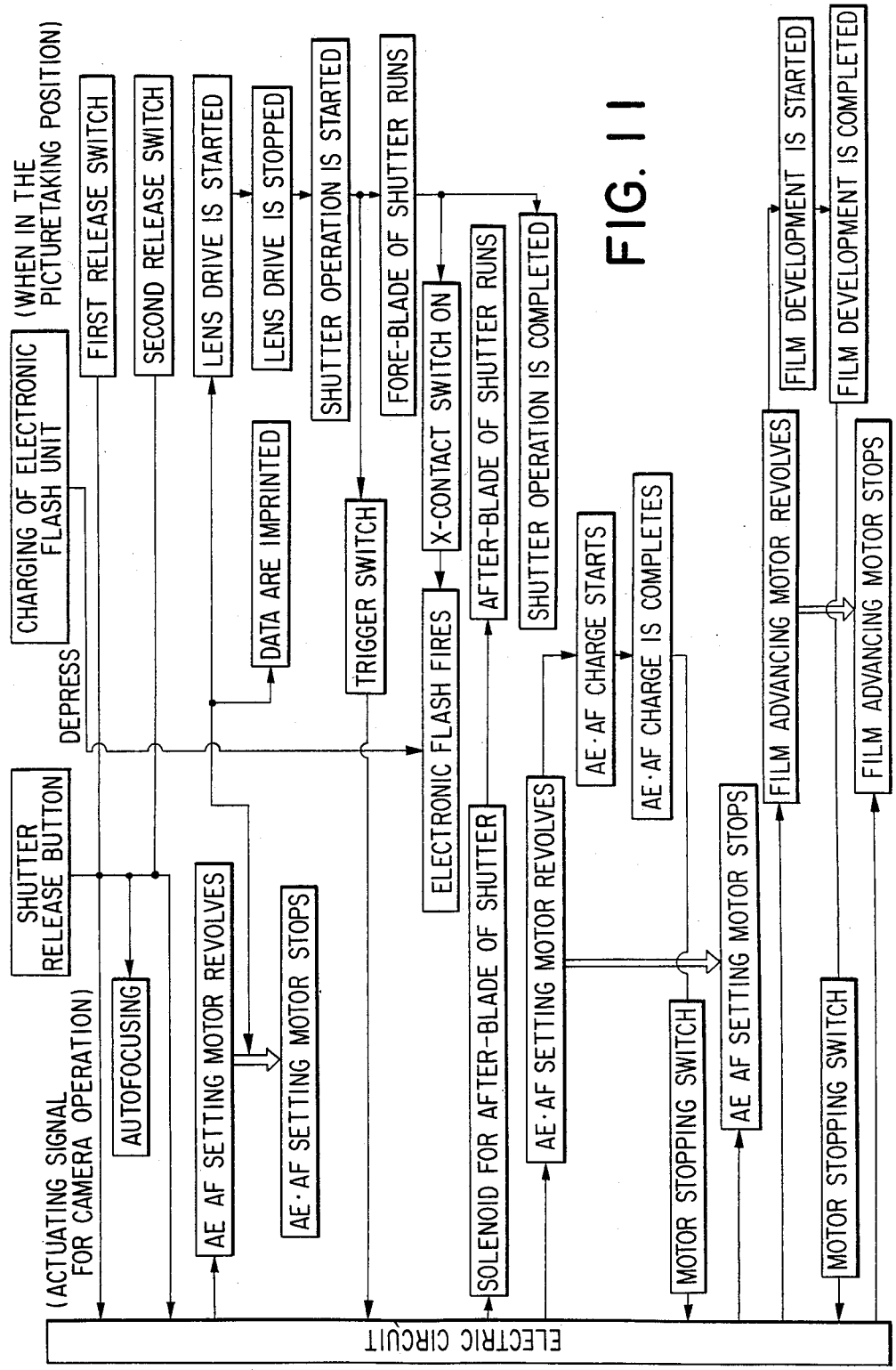
FIG. 11 is a sequential time chart for the examples in the invention.

In the third example shown in FIG. 10, what is, different from the foregoing first example is that, whereas in the first example exposure lens 3 and reflex mirror 5 are all fixed to movable member 2, the third example is such that exposure lens 3b is movable with respect to moveable member 2b and reflex mirror 5b is fixed to movable member 2b. Exposure lens 3b is fixed to a lock lever 22b which has a pivot 23b on movable member 2b and which is slidably movable along a cam slot 14b that is provided on fixed member 1b. Therefore, when movable member 2b is raised to the up position, the optical axis of exposure lens 3b becomes nearly parallel with the sheet film plane and at an angle of about 45° to the plane of reflex mirror 5b, while in the folded position that movable member 2b is pushed down, exposure lens 3b is in a position as shown in FIG. 10(a). The mechanism in this example is slightly more complex than that in the first example, but has the advantage that the camera becomes thinner and more compact in the folded position.

The structure of the camera of the invention is as has been described above. The handling and mechanical operation of the camera in the examples are subsequently described below:

First, film cassette C is loaded. By depressing opening-closing button 75 of roller cover 7, roller cover 7 opens. After that, when loading film cassette C and closing roller cover 7, film-advancing rollers 72 are engaged with film-advancing gears to thereby rock the rollers.

When movable member 2 is raised to the up position, (1) a catch in the portable condition is disengaged, (2) electronic flash unit 91 is popped up, (3) exposure lens 3 and reflex mirror 5 are set, (4) bellows 54 is set, (5) electronic flash switch 91 is ON, (6) light-shield member 19 moves to the light-shield position, and (7) supporting member 4 is locked.

The picture-taking sequence is indicated in the sequence time chart.

The camera folding is made by pushing the lock levers 22 to push down movable member 2.

Since certain changes may be made in the above photographic film assemblage and photographic apparatus without departing from the scope of the invention herein involved, it is intended that all matter containing in the above description or shown in the accompanying drawings shall be interpreted as illustrative and not in a limiting sense.

What is claimed is:

1. In a folding camera of the type having a base housing for holding a film cassette containing a plurality of film sheets, means for exposing a film sheet to light received from a subject by an objective lens and reflected from a reflex mirror to the film sheet at an exposure position in the base housing, and means for developing the film sheet and advancing it from an exit end of the base housing, the improvement wherein said means for exposing comprises a movable member supporting said objective lens and reflex mirror which is movable between a closed position forming a closure to the base housing and an open position in which said movable member is elevated above said base housing, said objective lens being rididly fixed to said movable member at a distal end thereof in an operative position for exposure, and a supporting member connected to the other end of said movable member and being pivotally coupled to said base housing at an end thereof opposite from the film exit end.

2. The folding camera as defined in claim 1, wherein said objective lens is moved to an inoperative position within said base housing when said movable member is moved to the closed position.

3. The folding camera as defined in claim 1, wherein said reflex mirror is mounted to said movable member so as to form an angle in the open position with an upper surface of said base housing, and said supporting means is pivotally coupled at a position of the upper surface of said base housing in proximity to one end of said reflex mirror.

4. The folding camera as defined in claim 1, further comprising a built-in flash unit which is movable to an operative position in accordance with the movement of said movable member to said open position.

5. The folding camera as defined in claim 4, wherein said flash unit includes a condenser, wherein a charging operation of said condenser is automatically started when said movable member is moved to the open position.

6. The folding camera as defined in claim 1, further comprising a light shielding member for shielding an opening formed between said base housing and said movable member in the open position, said light shielding member being spring biased to close said opening when said movable member is moved to the open position.

7. The folding camera as defined in claim 1, wherein said objective lens and said reflex mirror are rigidly mounted to said movable member in a fixed positional relationship to each other for exposing the film sheet at the exposure position when said movable member is in the open position.

8. In a folding camera of the type having a base housing for holding a film cassette containing a plurality of film sheets therein, means for exposing a film sheet with light from a subject received by an objective lens and reflected from a reflex mirror to the film sheet at an exposure position in the base mounting, and means for developing the film sheet and advancing it out from exit end of said housing, the improvement comprising a movable member mounting said objective lens and said reflex mirror which is movable between a closed position forming a closure to said base housing and an open position in which it is elevated above said base housing, and a supporting member connected to one end of said movable member and being pivotally coupled to the base housing, wherein said objective lens is rigidly mounted to a lock arm, one end of which is pivotally connected to a distal end of said movable member, and the other end of which is held in cam slot defined within said base housing and movable between an operative position for said objective lens and an inoperative position wherein said objective lens is folded in the base housing, and wherein said reflex mirror is rigidly mounted to said movable menber so as to be in an operative positional relationship with said objective lens when said movable member is moved to the open position.

* * * * *